(12) United States Patent
Huang

(10) Patent No.: US 6,786,308 B1
(45) Date of Patent: Sep. 7, 2004

(54) ANTI-LOCK BRAKE SYSTEM FOR A BICYCLE

(76) Inventor: Tan-Cheng Huang, 6Fl., No. 2-1, Swei St., Taichung (TW)

(*) Notice: Subject to any disclaimer, the term of this patent is extended or adjusted under 35 U.S.C. 154(b) by 0 days.

(21) Appl. No.: 10/391,236

(22) Filed: Mar. 18, 2003

(51) Int. Cl.⁷ .................................................. B62L 1/02
(52) U.S. Cl. .................................................. 188/24.12
(58) Field of Search .......................... 188/24.11, 24.12, 188/24.19, 24.21, 24.22

(56) References Cited

U.S. PATENT DOCUMENTS 5,168,962 A * 12/1992 Yoshigai ................... 188/24.19
5,503,253 A * 4/1996 Li ............................ 188/24.12

* cited by examiner

*Primary Examiner*—Chris Schwartz
(74) *Attorney, Agent, or Firm*—Charles E. Baxley

(57) ABSTRACT

An anti-lock brake system for a bicycle having sliding assembly (having a brake shoe therein) and a plurality of springs defined in a brake shoe holder in turn, a bottom of the brake shoe holder and a connecting side of the sliding assembly are correspondingly in gradient formed and both of them to be abutted against each other and they are slanted formed outwardly in accordance with the direction of the rotation of the tire of the bicycle. The sliding assembly further includes a plurality of recesses formed therein for receiving sliding members, an abrasion-resistant member disposed at the bottom of the recess of the brake shoe holder.

11 Claims, 11 Drawing Sheets

ANTI-LOCK BRAKE SYSTEM FOR A BICYCLE

BACKGROUND OF THE INVENTION

1. Field of the Invention

The present invention relates to a brake device, and more particularly to an anti-lock brake system for a bicycle.

2. Description of the Prior Arts

A conventional brake device for a bicycle generally includes a pair of brake shoes and a brake arm, the brake shoes are coupled to both legs of the brake arm and then the brake arm is mounted to the rear and/or front fork of a bicycle with the brake shoes standing oppositely at both sides of the wheel rim of the bicycle. The brake shoes are employed to press against the wheel rim from both sides by virtue of the brake arm and a friction to be generated to stop the rotation of the tires. This kind of brake device has been commonly used in nowadays, however, there are still some shortcomings need to be improved:

In event of an emergency brake, the braking force is greater than the friction force of the tires due to a great force applied by the rider to press on the hand brake in order to stop the rotation of the tires, which will generate a dead lock of the tire in a sudden and result in a skidding and overturning of the bicycle and hurt of the rider.

A buffering device targeting at the solution of the above problem is shown in FIG. 1 including: a brake shoe holder 10, the brake shoe holder 10 to be mounted to a brake arm by virtue of a connecting rod 11 coupled at a side opposite to the wheel rim of the tire and has a pair of protruding edges opposite to each other defining a space for accommodating a sliding piece 17 therein, furthermore, the brake shoe holder 10 defining a threaded hole 12 at a first end for engaging a bolt 13 and a recess 14 at a second end for accommodating an elastic member 15, a brake shoe 16 to be engaged in the sliding piece 17 and the sliding piece 17 has a first end connected to the elastic member 15 and a slot 18 defined at a second end engaging with the bolt 13 for preventing the sliding piece 17 from sliding out from the brake shoe holder 10, in such a manner, taking use of the slide of the sliding piece 17 in the space of the brake shoe holder 10 and the elastic member 15 to buffer a friction of the brake shoe 16 while it pressing against the wheel rim the tire. Although this braking device has been commonly used, there are also some shortcomings need to be improved:

First, this braking device is too complicated that the brake shoe holder 10 not only needs a pair of protruding opposite edges to define a space for the receiving and slide of the brake shoe 16 therein but also the brake shoe 16 should be engaged in the a sliding piece 17 having a slot 18 for engaging a bolt 13, in this case, it's not only complicated in assembling process but the production cost is increased as well.

Second, there is only a very short distance (about a 1 mm in distance) for the slide of the brake shoe 16 in the brake shoe holder 10 according to this device, which is not long enough for buffering the friction generated from the braking motion and accordingly a rider is not able to control the bicycle effectively.

Third, in accordance with the brake device for a bicycle, the brake shoe only has a very short contracting distance while a braking motion being operated and it will be contracted to an end thereof and will not return to the original position till the rider release the handle brake, thereby, there will be a great friction caused from a part of the tire and the ground and do a great harm to the tire.

Fourth, in accordance with this conventional brake device for a bicycle, the brake shoe holder 10, the recess 14, the brake shoe 16 and the sliding piece 17 all move in a straight line, however, the tires of the bicycle do rotational movement, in such a manner, a stress of the tire is generated from the friction of the brake shoe 16 while a braking motion being operated which can't be transmitted completely to the elastic member 15 and a part of it can't be counteracted (which is perpendicular to a direction of the movement of the brake shoe 16), as a result, the brake shoes 16 is not allowed to move smoothly and freely in the space of the brake shoe holder 10 and great frictions and collisions will be caused in the related parts.

The present invention has arisen to mitigate and/or obviate the afore-described disadvantages of the conventional anti-lock brake system for a bicycle.

SUMMARY OF THE INVENTION

In accordance with one aspect of the present invention, there is provided an anti-lock brake system for a bicycle having sliding assembly (having a brake shoe therein) and a plurality of springs defined in a brake shoe holder in turn, an acting direction and location of the springs are corresponding to that stress direction of the brake shoe, the brake shoe is partially engaged in the brake shoe holder, a bottom of the brake shoe holder and a connecting side of the sliding assembly is correspondingly in gradient formed and both of them to be abutted against each other and slantingly formed outwardly in accordance with the direction of the rotation of the tires of the bicycle. (For an alternative that a plurality of sliding members also can be defined between the bottom of the brake shoe holder and the sliding assembly and in addition, an abrasion-resistant member can be defined at the bottom of the recess of the brake shoe holder). In such a manner, which not only can buffer a braking friction generated from an emergency brake but also prevent a great friction from being caused in the related parts of the braking device.

The primary objective of the present invention is to provide an improved anti-lock brake system for a bicycle, which is not only capable of buffering a braking friction from being generated from an emergency brake but also preventing a great friction caused in the related parts of the braking device.

Another objective of the present invention is to provide a simple anti-lock brake system for a bicycle, which is not only reduce the production cost to the least but also simplify the assembling process.

A further objective of the prevent invention is to provide an improved anti-lock brake system for a bicycle allowing a free and smooth slide of the sliding assembly in the brake shoe holder and the quick return of the brake shoe to the original position so as to provide a smooth braking operation.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENTS

Figure 1:
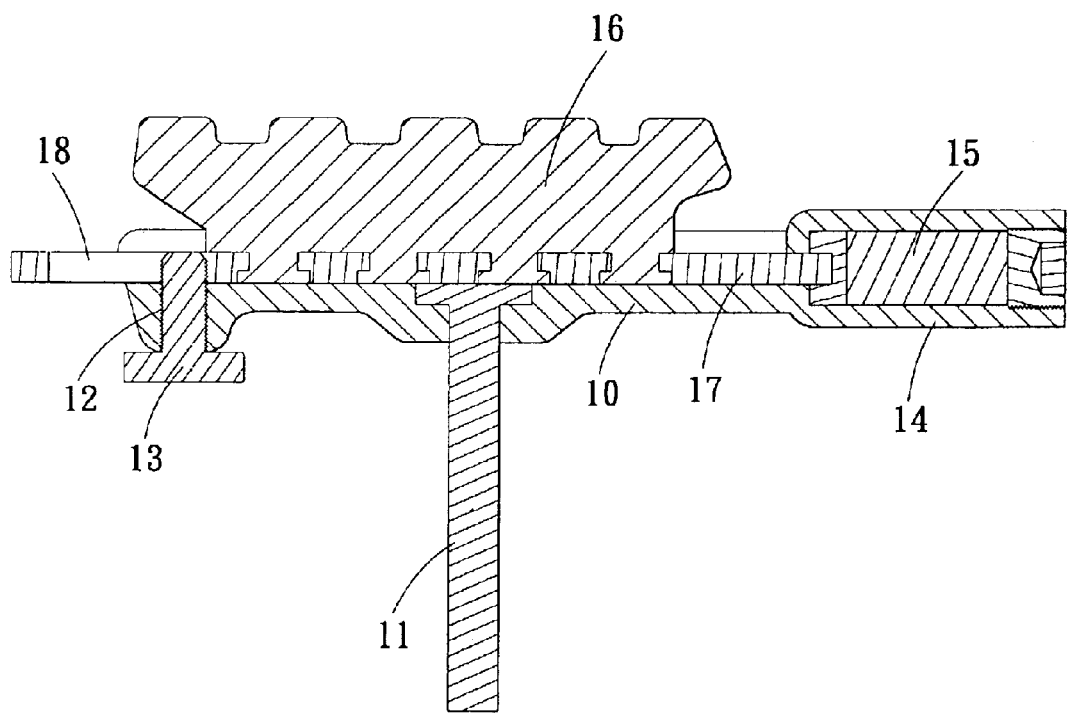
FIG. 1 is a cross sectional view of a conventional brake device for a bicycle.
Figure 2:
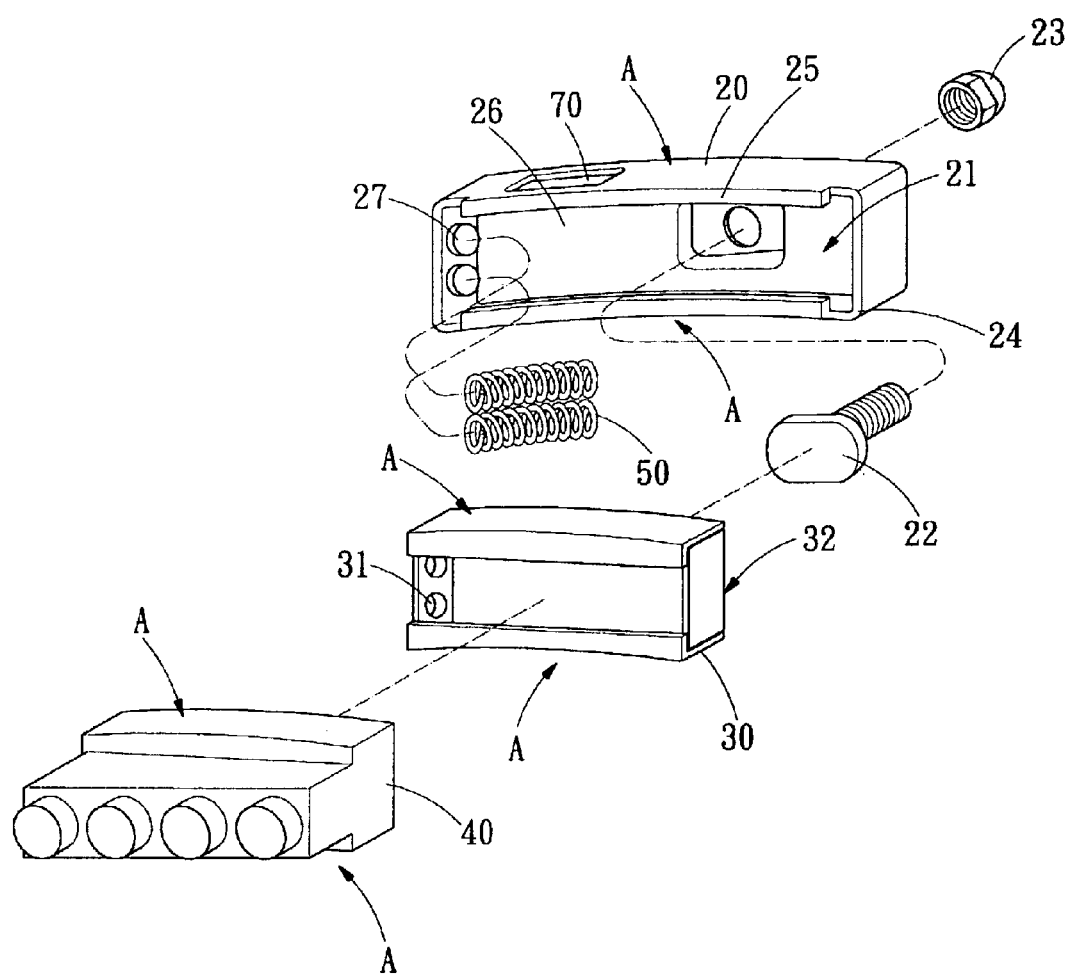
FIG. 2 is an exploded view of an anti-lock brake system for a bicycle in accordance with a first embodiment of the present invention.
Figure 3:
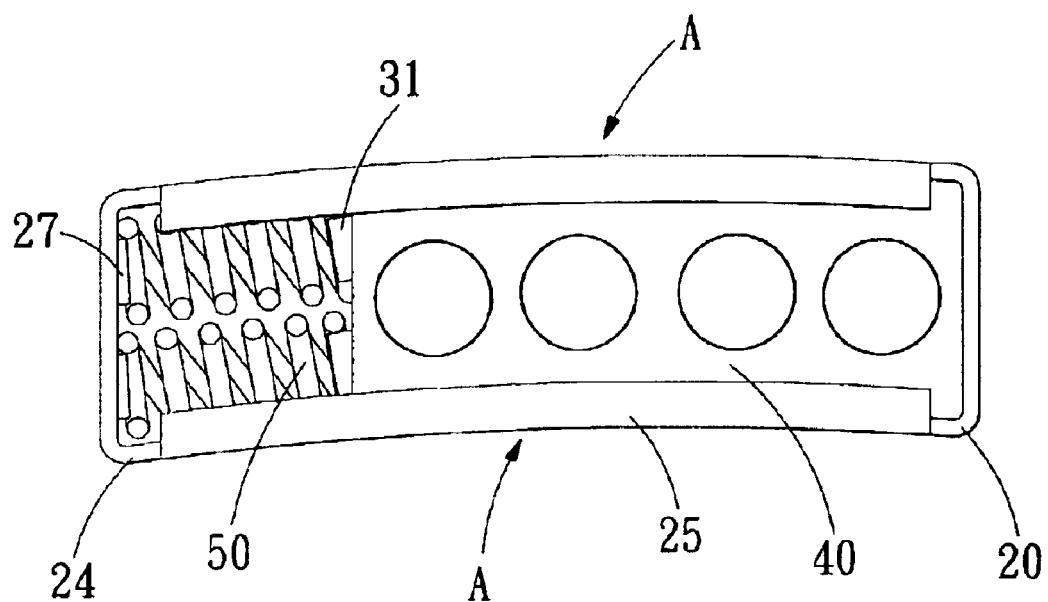
FIG. 3 is an elevational view of an anti-lock brake system for a bicycle in accordance with the first embodiment of the present invention.
Figure 4:
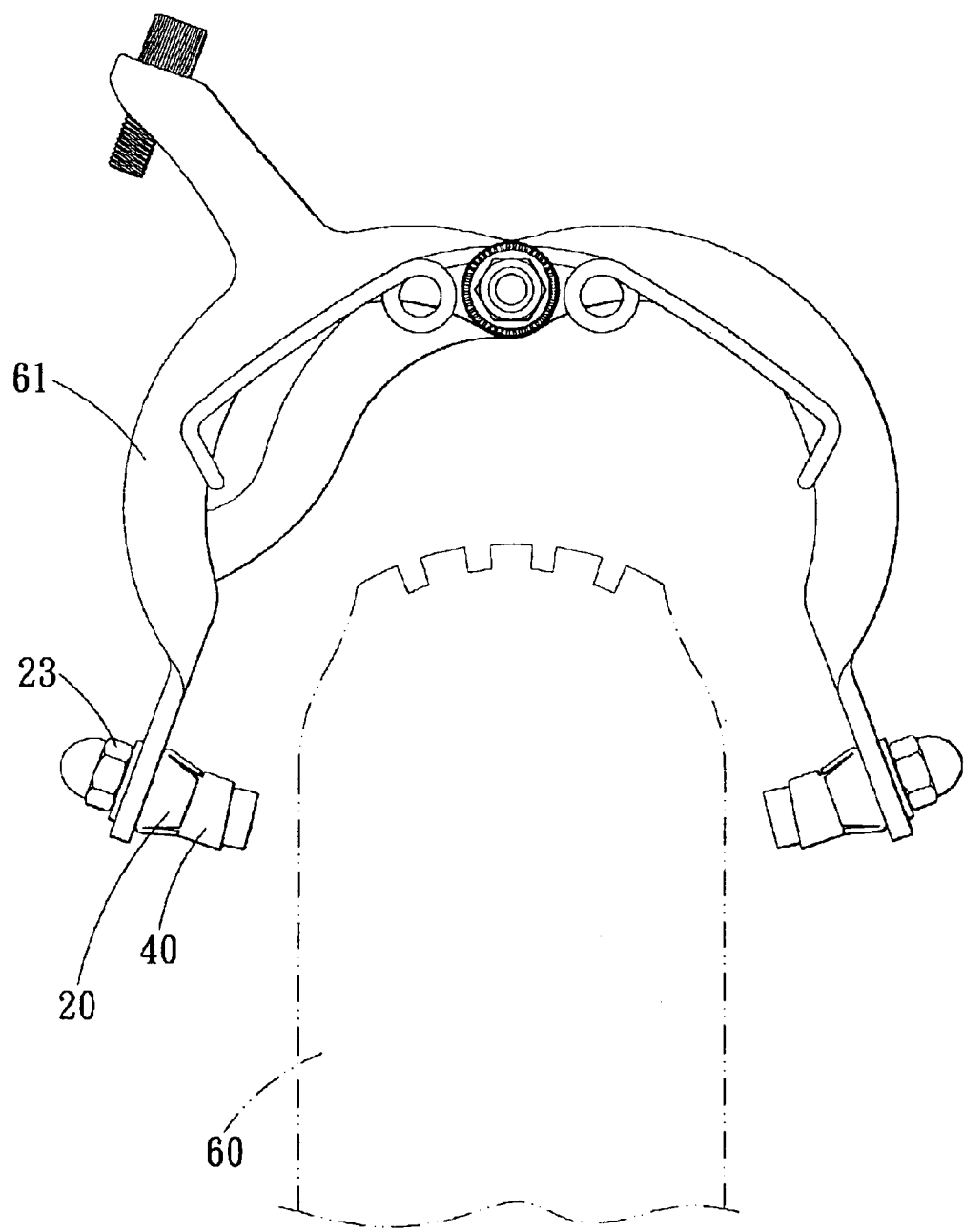
FIG. 4 is a schematic illustration view in accordance with the first embodiment of the present invention showing an anti-lock brake system mounted to a brake arm of a bicycle.

Referring to the FIGS. 2–4, in which, an anti-lock brake system in accordance with one aspect of the present invention comprises a brake shoe holder 20, a sliding assembly 30, a brake shoe 40 and two springs 50. The brake shoe holder 20 has a shape of curved recess 21 and an opening 24 defined at a side facing to a wheel rim 60 and has bolt 22 located at a bottom thereof which is respectively to be coupled to both ends of a brake arm 61 by virtue of the bolt 22 and screw nuts 23.

Both sides of the opening 24 are curvely formed with edges 25, a slope 26 is formed at the bottom of the recess 21 in a manner that the slope 26 slants outward in a forward rotating direction of the tire, two protrusions 27 are formed at a side corresponding to the slope 26. The brake shoe holder 20 is curvely formed in an arc A corresponding to a rotary angel of the wheel rim 60.

The sliding assembly 30 is received in the recess 21 of the brake shoe holder 20 and confined in the opening 24 by the curved edge 25. The brake shoe 40 is partially accommodated in sliding assembly 30 and partially protruding the opening 24 of the brake shoe holder 20 therefrom (corresponding to the both sides of the wheel rim 60 of the bicycle). A pair of protrusions 31 are formed at a side of the sliding assembly 30 corresponding to that protrusions 27 of the brake shoe holder 20. The sliding assembly 30 also has a slope 32 formed at the bottom of the sliding assembly in a manner that the slope 32 slants outward in the forward rotating direction of the tire corresponding to the slope 26 of the brake shoe holder 20. The spring 50 is accommodated in the recess 21 of the brake shoe holder 20 having a first end engaged with the protrusions 27 and a second end engaged with the protrusions 31 of the sliding assembly 30.

Figure 5:
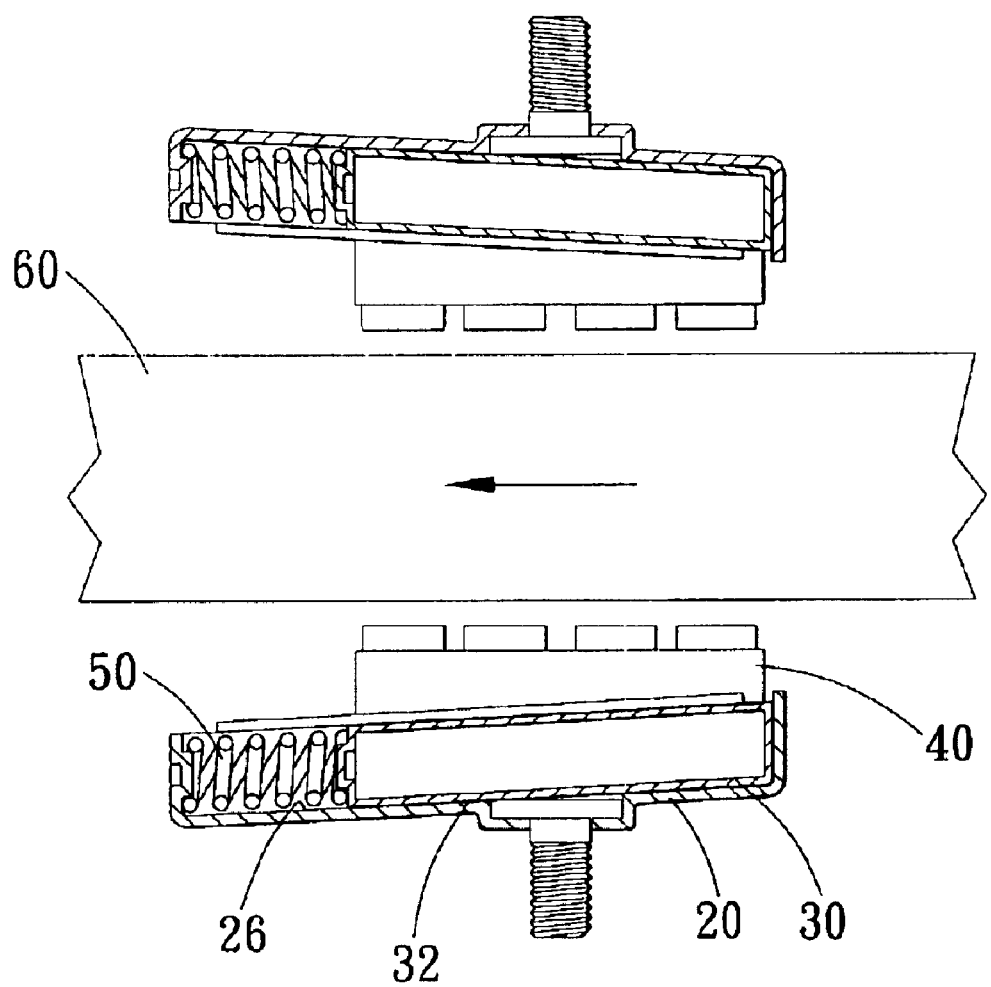
FIG. 5 is a cross sectional view in accordance with the first embodiment of the present invention of showing the status of an anti-lock brake system for a bicycle before a braking action being operated.

Referring further to the FIGS. 5–8, which shows the first embodiment of the present invention. In the FIG. 5 shows the status of the anti-lock brake system of the present invention before a braking action being operated, in which, the brake shoe holders 20 at both ends of the brake arm 61 are apart from the wheel rim 60 of the bicycle by virtue of the brake arm 61, the sliding members 30 are pushed to one end of the recesses 21 of the brake shoe holders 20 by the springs 50 and further by the cooperation of the slope 32 of the sliding assembly 30 and the slope 26 of the brake shoe holder 20 abutting against each other, thereby the wheel rim 60 of the bicycle is not in the braking status (is not being pressed by the brake shoes 40).

Figure 6:
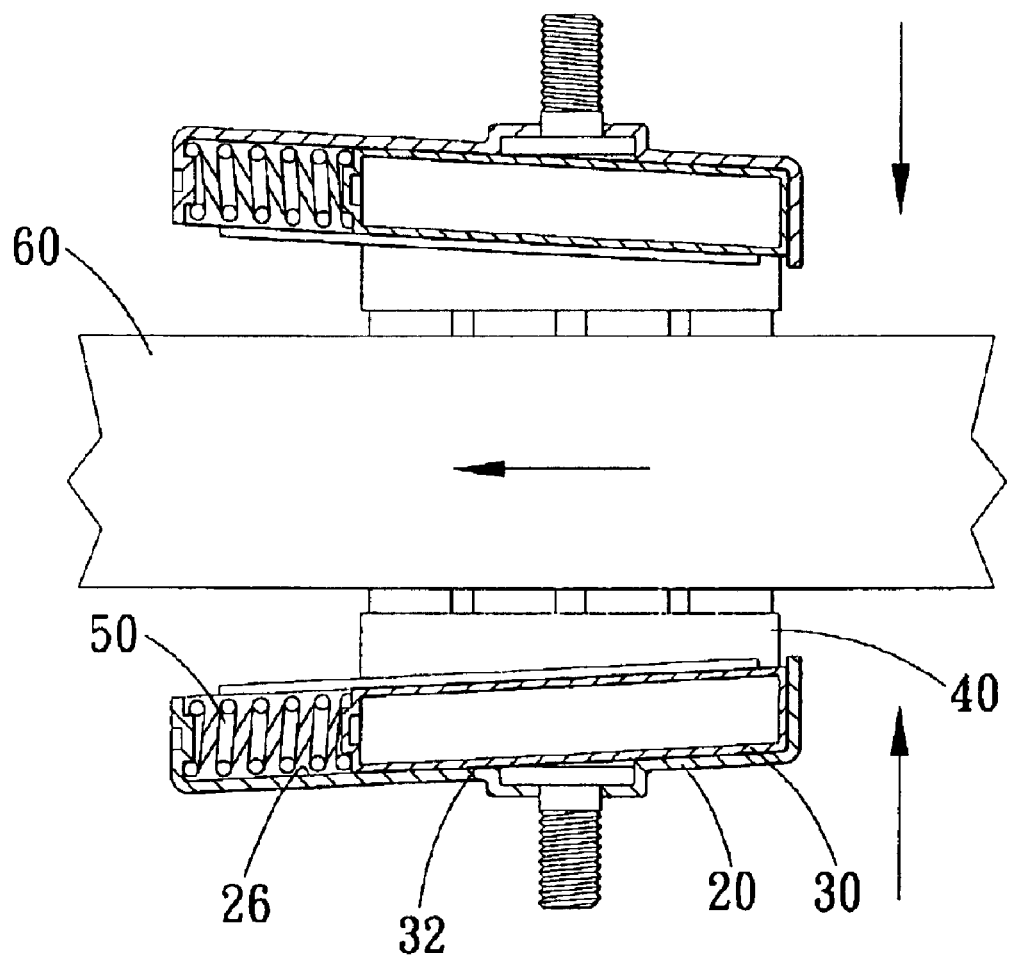
FIG. 6 is a cross sectional view in accordance with the first embodiment of the present invention of showing the very beginning status of an anti-lock brake system for a bicycle while a braking action being operated.

Referring the FIG. 6, which shows the very beginning status of a braking action just be operated, when a rider press the hand brake, the brake arm 61 will enforce the two brake shoe holders 20 to press against the wheel rim 60 of the bicycle and the part of the brake shoe 40 protruding from the opening 24 of the brake shoe holder 20 begin to rub the wheel rim 60 of the bicycle, right this moment, a great inertial stress will be transmitted to the brake shoes 40 from the wheel rim 60 of the bicycle, accordingly it will be further transmitted to the slopes 32 and the springs 50 by the brake shoes 40 and the sliding assembly 30, due to the inertial force of the bicycle is minor than the elastic force of the springs 50, the sliding assembly 30 stay motionlessly in the brake shoe holders 20, and thereby the bicycle in a low speed can be stopped.

Figure 7:
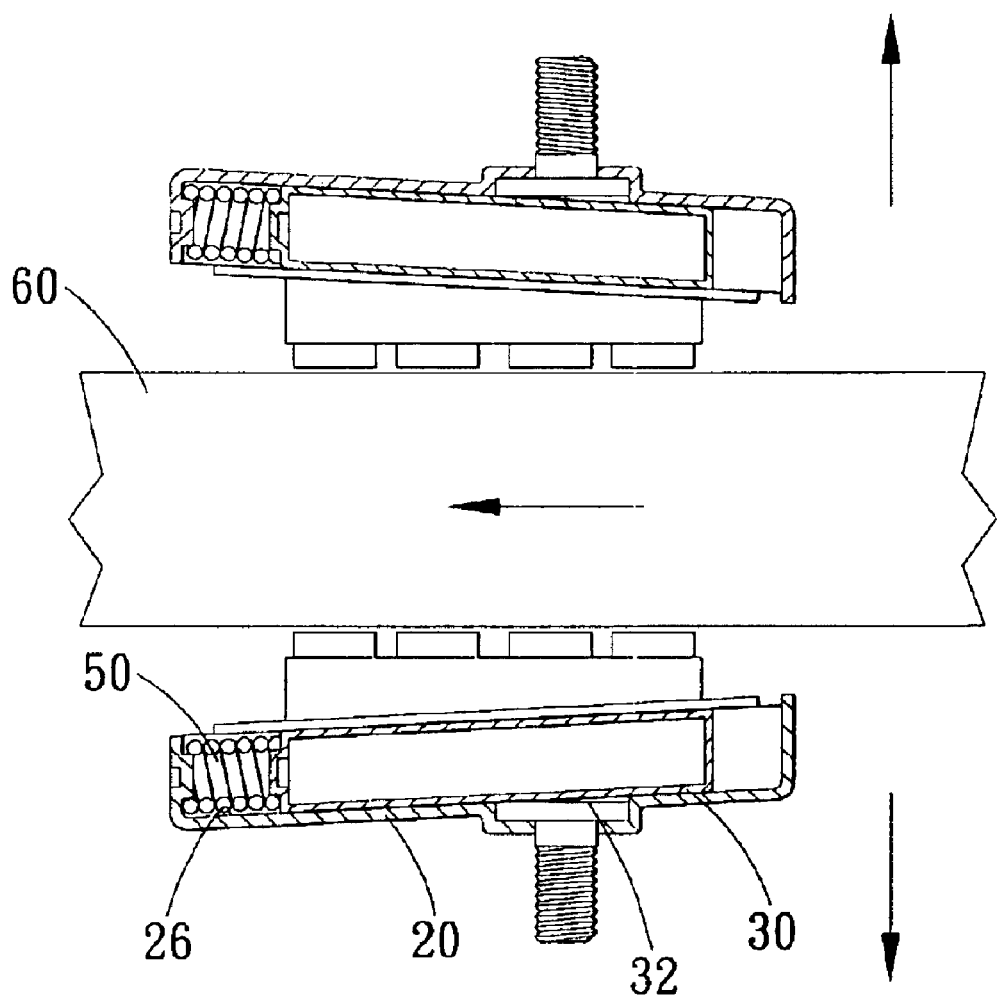
FIG. 7 a cross sectional view in accordance with the first embodiment of the present invention of showing a continuous braking action of an anti-lock brake system for a bicycle is being operated.

Referring to the FIG. 7, which shows a continuous braking action (an emergency brake) of an anti-lock brake system for a bicycle is being operated, in this status, both a force the rider pressed on the hand brake and the inertial force of the bicycle are very great, and the inertial force of the bicycle is greater than the elastic force of the springs 50, so the sliding assembly 30 begin to push and compress the springs 50, accordingly the sliding assembly 30 slide relatively in the recess 21 of the brake shoe holder 20 and slide slantingly outward by a cooperation of the slope 32 of the sliding assembly 30 and the slope 26 of the brake shoe holder 20 abutting against each other and the brake shoes 40 slide slantingly outward too, in such a manner, a stress generated form the braking action can be absorbed by the slope 26 and the springs 50 without difficulties by virtue of the arc A of the brake shoe holders 20, the sliding members 30 and the brake shoes 40, thereby the friction force of the brake shoes will be reduced and the braking force will not be greater than the friction of the tire of the bicycle (no dead lock of tire's rotation happened), furthermore, the wheel rim 60 can be a bit rotate forward and no overly great friction force between the tires and the ground caused and the rider will not lose steering.

Figure 8:
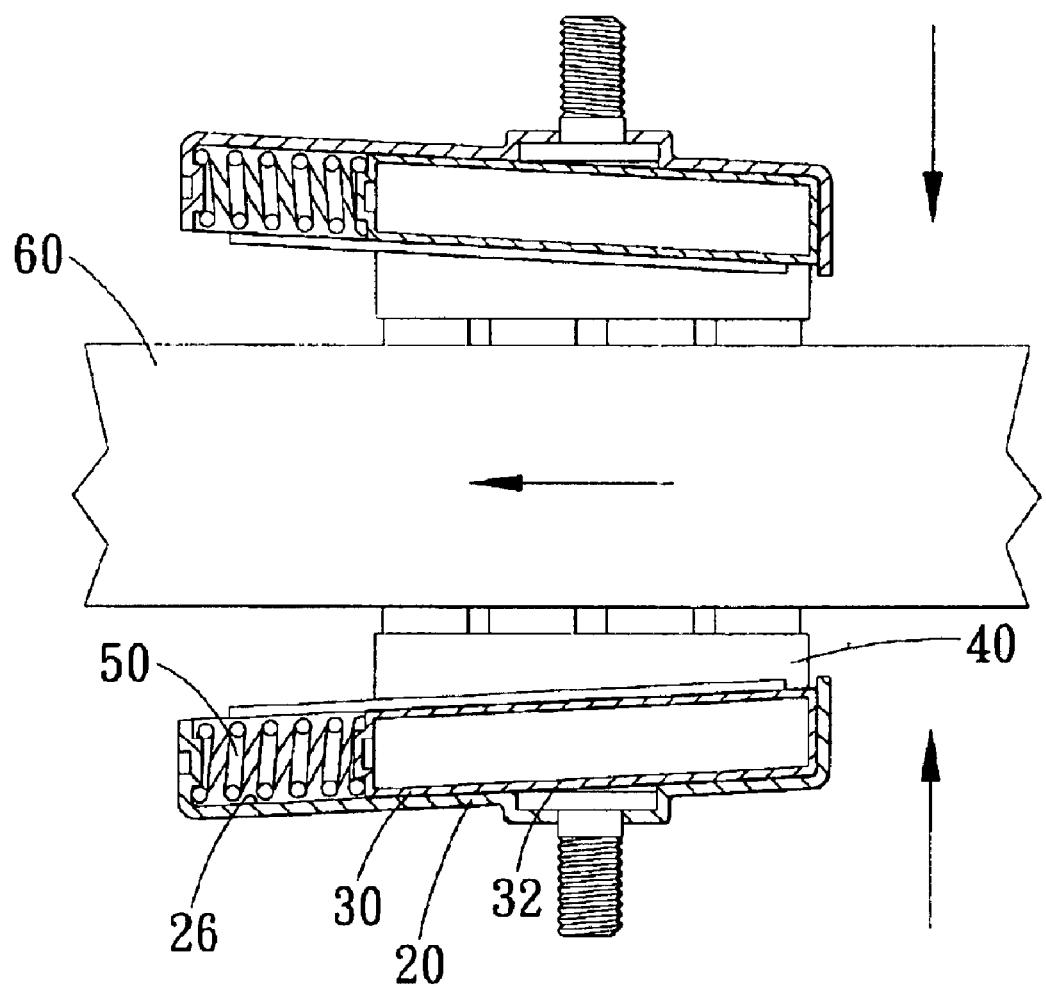
FIG. 8 is a cross sectional view in accordance with the first embodiment of the present invention of showing a second circle of braking operation of an anti-lock brake system for a bicycle.

Referring the FIG. 8, which shows a secondary circle of the braking action, due to the slant slide of the brake shoes 40, the friction force is reduced, the springs 50 begin to release the restoring force pushing the sliding assembly 30 to return slantingly inward by the cooperation of the slope 26,32, which increase the friction force of the brake shoes 40 acting on the wheel rim 60, such an action of the sliding members 30 will be repeatedly so as to achieve an effect of an anti-lock brake system and an emergency brake of he bicycle can be smoothly eased off by the release and compress of the brake alternatively happened in a twinkling, in this manner the rider will not lose steering control of the bicycle and no overly friction caused in the related parts.

Furthermore, the braking distance of the tire is based on the elastic force of the springs, the inclination of the slope and the inertia force, so which can be adjusted by the manufacturers as deferent requirements of the riders.

It is to be noted that the brake shoe holders 20 are permitted to be whole-set replaced, which is easy for assembling and dismantling and the structure is simple (reduce the production cost).

Referring again to the FIG. 2, a plurality of draining holes 70 can be defined in a side of the brake shoe holder 20 which allowing for the drainage of the mud or greasy dirt therefrom and allow the rider inject grease or clean the inside therethrough.

An anti-lock brake system for a bicycle in accordance with the first embodiment of the present invention is described as above.

Figure 9:
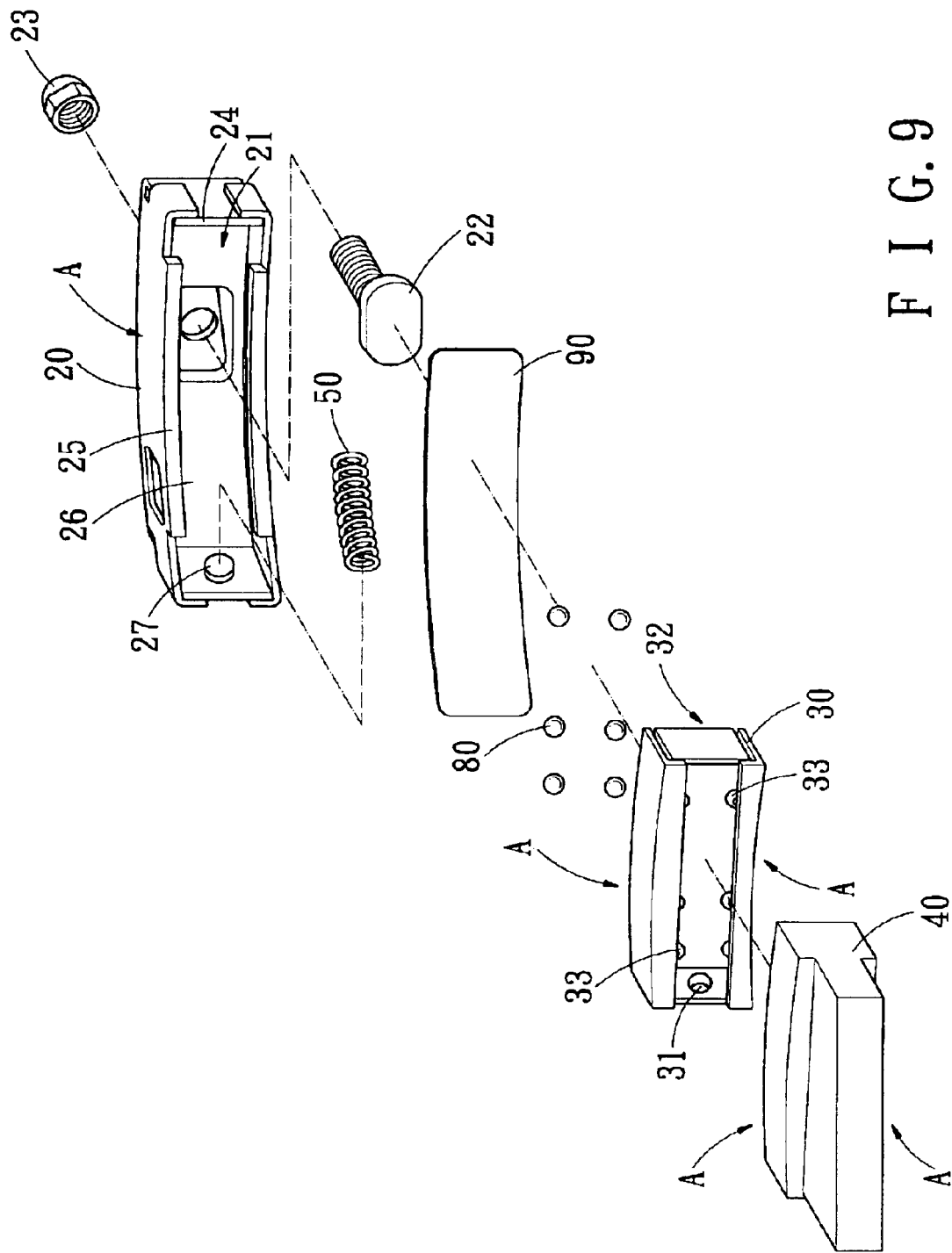
FIG. 9 is an exploded view of an anti-lock brake system for a bicycle in accordance with a second embodiment of the present invention.
Figure 10:
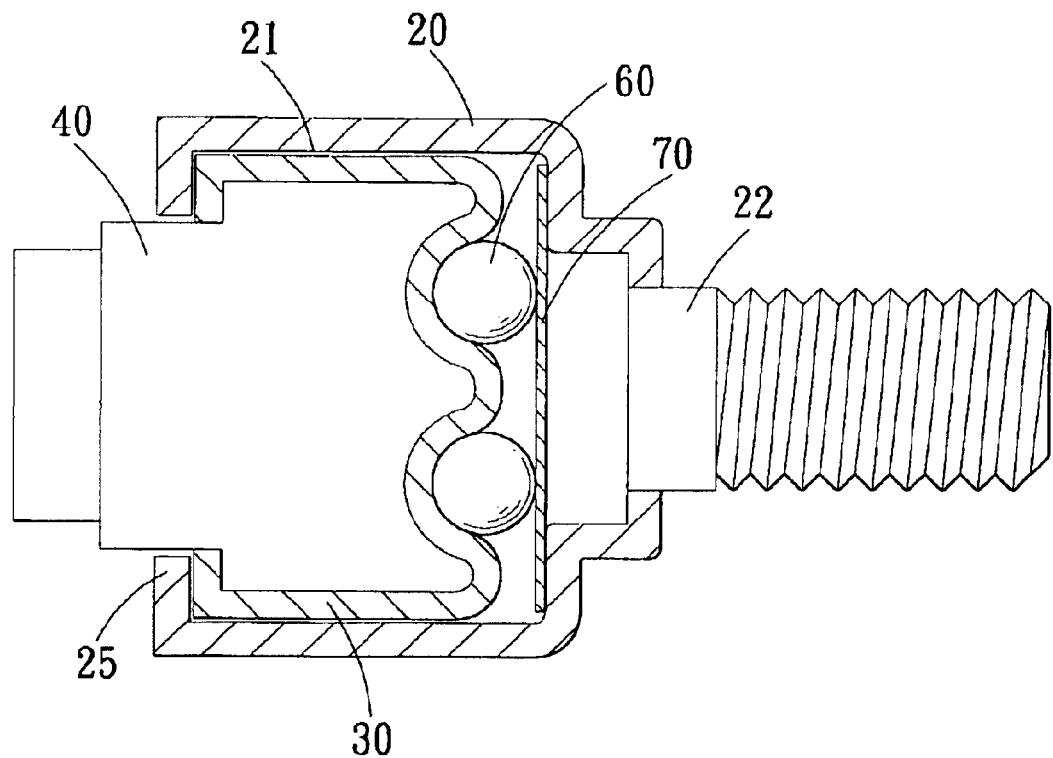
FIG. 10 is a longitudinal sectional view of anti-lock brake system for a bicycle in accordance with the second embodiment of the present invention.
Figure 11:
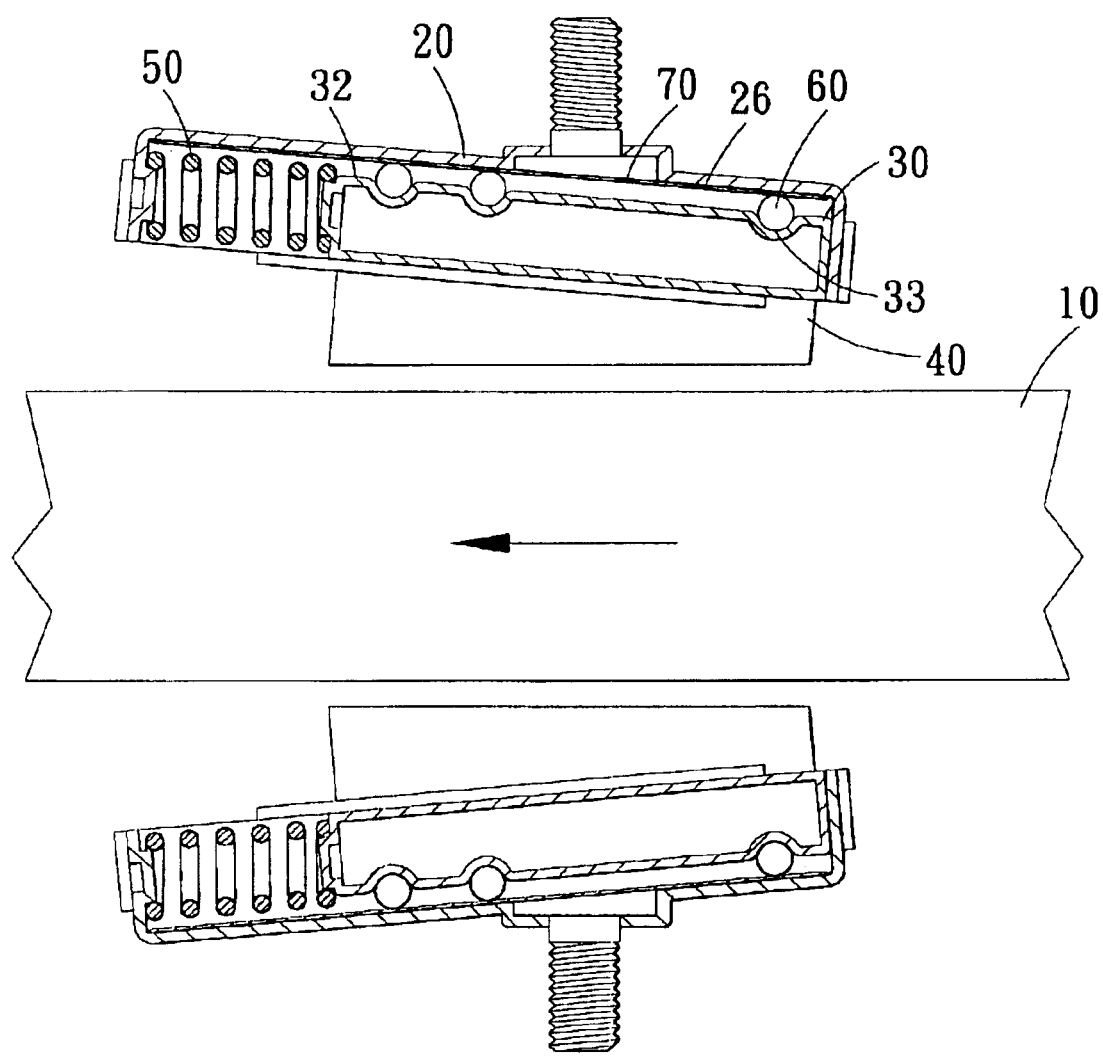
FIG. 11 is a cross sectional view in accordance with the second embodiment of the present invention of showing the status of an anti-lock brake system for a bicycle before a braking action being operated.

In accordance with a second embodiment of the present invention there is provided another anti-lock brake system for a bicycle as shown in FIGS. 9–11 which structural arrangement is basically identical with that of the first embodiment, the only difference is: a plurality of sliding members 80 and an abrasion-resistant member 90 are added, furthermore, the sliding assembly 30 is provided with a plurality of cavities 33.

The sliding members 80 may be metal balls, rollers, needle rollers or the like, slidably received in the respective cavities 33 of the sliding assembly 30, which will be rolling in the event that the sliding assembly 30 is sliding so as to provide a smooth slide of the sliding assembly 30 in the recess 21 of the brake shoe holder 20.

The abrasion-resistant member 90, corresponding to the slope 26 at the bottom of the recess 21 of the brake shoe holder 20, is made from abrasion-resistant material, which correspondingly providing a rolling friction to the sliding members 80.

Due to the working principles of the two anti-brake lock systems in according with the first and second embodiment of the present invention are identical, further remarks on this matter will seem superfluous.

While we have shown and described various embodiments in accordance with the present invention, it should be clear to those skilled in the art that further embodiment may be made without departing from the scope of the present invention.

What is claimed is:

1. An anti-lock brake system for a bicycle correspondingly mounted to a break arm comprising: a brake shoe holder, a sliding assembly, a brake shoe and a spring, wherein:

the brake shoe holder has a recess defined at a side facing toward the wheel rim of a bicycle and coupled to a end of the break arm, a slope formed at a bottom of the recess of the brake shoe holder in a manner that the slope slant outward in a forward rotating direction of a tire of the bicycle;

the sliding assembly is received and confined in the recess of the brake shoe holder, a brake shoe is received in the sliding assembly, a slope formed at a bottom of the sliding assembly in a manner that the slope slant outward in the forward rotating direction of the tire of the bicycle corresponding to the slope of the brake shoe holder;

the spring is accommodated in the recess of the brake shoe holder having a first end abutting against the brake shoe holder and a second end abutting against the sliding assembly.

2. The anti-lock brake system for a bicycle as claimed in claim 1, wherein the brake shoe holder, the sliding assembly and the brake shoe each have an arc-shaped corresponding to the arc of the wheel rim.

3. The anti-lock brake system for a bicycle as claimed in claim 1, wherein the brake shoe holder defines a bolt at a bottom so as to couple with the brake arm.

4. The anti-lock brake system for a bicycle as claimed in claim 1, wherein the brake shoe holder defines a pair of protrusions at a side corresponding to the slope face and the sliding assembly also defines a pair of protrusions at a side, the protrusions of the sliding assembly corresponding to that of the brake shoe holder, the spring has a first end mounted onto the protrusion of the sliding assembly and a second end mounted onto the protrusion of the brake shoe holder.

5. The anti-lock brake system for a bicycle as claimed in claim 1, wherein the brake shoe holder defines a plurality of draining holes for allowing the drainage of mud or greasy dirt or allowing a rider to inject grease and clean it therethrough.

6. The anti-lock brake system for a bicycle as claimed in claim 1, said sliding assembly has a plurality of cavities formed at a side corresponding to the recess of the brake shoe holder.

7. The anti-lock brake system for a bicycle as claimed in claim 6, further comprising a plurality of sliding members received in the corresponding cavities of the sliding assembly for bearing the sliding assembly to slide within the recess.

8. The anti-lock brake system for a bicycle as claimed in claim 7, further comprising an abrasion-resistant member disposed at the bottom of the recess of the break shoe holder for providing a rolling friction with respect to the sliding members.

9. The anti-lock brake system for a bicycle as claimed in claim 7, wherein the sliding members are balls.

10. The anti-lock brake system for a bicycle as claimed in claim 7, wherein the sliding members are rollers.

11. The anti-lock brake system for a bicycle as claimed in claim 7, wherein the sliding members are needle rollers.

* * * * *